United States Patent [19]

McGinley et al.

[11] Patent Number: 5,736,177
[45] Date of Patent: Apr. 7, 1998

[54] CELLULOSE COMPOSITION, ITS PREPARATION, AND ITS USE IN A LIPID

[75] Inventors: Emanuel J. McGinley, Morrisville; Aaron C. Venables, Yardley, both of Pa.

[73] Assignee: FMC Corporation, Philadelphia, Pa.

[21] Appl. No.: 208,153

[22] Filed: Mar. 8, 1994

[51] Int. Cl.$^6$ .................................................. A23L 1/0534
[52] U.S. Cl. ............................ 426/96; 426/573; 426/604
[58] Field of Search .................................. 426/573, 601, 426/604, 96

[56] References Cited

U.S. PATENT DOCUMENTS

| | | |
|---|---|---|
| 2,978,446 | 4/1961 | Battista et al. . |
| 3,067,037 | 12/1962 | Herald et al. . |
| 3,539,365 | 11/1970 | Durand et al. . |
| 3,669,681 | 6/1972 | Shoaf et al. . |
| 4,375,483 | 3/1983 | Shuford et al. . |
| 4,605,563 | 8/1986 | Heine et al. . |
| 4,652,458 | 3/1987 | Frost et al. . |
| 4,710,390 | 12/1987 | Schumacher .............................. 426/804 |
| 4,814,195 | 3/1989 | Yokoyama ................................ 426/804 |
| 5,011,701 | 4/1991 | Baer ......................................... 426/804 |
| 5,104,677 | 4/1992 | Behr ......................................... 426/804 |
| 5,139,797 | 8/1992 | Huzinec .................................... 426/804 |
| 5,178,896 | 1/1993 | Langner .................................... 426/804 |
| 5,192,569 | 3/1993 | McGinley ................................. 426/804 |
| 5,209,942 | 5/1993 | Bauer ....................................... 426/804 |
| 5,254,357 | 10/1993 | Langner .................................... 426/804 |
| 5,262,187 | 11/1993 | Hahn ........................................ 426/804 |
| 5,286,510 | 2/1994 | Bauer ....................................... 426/804 |
| 5,336,515 | 8/1994 | Murphy .................................... 426/573 |
| 5,366,750 | 11/1994 | Morano .................................... 426/573 |
| 5,376,396 | 12/1994 | Clark ....................................... 426/573 |
| 5,441,753 | 8/1995 | McGinley ................................. 426/96 |

*Primary Examiner*—Carolyn Paden
*Attorney, Agent, or Firm*—Polly E. Ramstad

[57] ABSTRACT

The invention is directed to both a thickener/stabilizer/gelling agent for edible lipids comprising a stabilizing effective amount of a combination of (1) a finely divided cellulose component and (2) a surfactant component comprising one or more surfactants, in powder aggregate form and the use of this agent to stabilize an edible lipid, and to the method of making the agent. The invention is also directed to the resulting stabilized lipids, which have viscosity and consistency characteristics that were previously only obtainable with use of stabilizers such as fats that have the undesirable effect of increasing LDL and decreasing HDL.

17 Claims, 3 Drawing Sheets

5,736,177

CELLULOSE COMPOSITION, ITS PREPARATION, AND ITS USE IN A LIPID

FIELD OF THE INVENTION

This invention is directed to thickener/stabilizer/gelling agents and their preparation. More particularly, this invention is directed to thickener/stabilizer/gelling agents for edible lipid systems wherein the agents comprise finely divided cellulose and selected surfactants.

BACKGROUND OF THE INVENTION

Many foodstuffs contain oils which are especially useful to impart flavor and taste characteristics. Most of the desirable, healthy oils, such as canola oil and safflower oil, are liquid at room temperature, whereas most of the undersirable, "unhealthy" oils, such as shortening and lard, have a plastic-like consistency. It is known that the viscosity and consistency of such oils can be increased by addition of finely divided solids, e.g., highly dispersed silica or silica gel in industrial applications or high-melting fat crystals in edible foods. See, for example, U.S. Pat. Nos. 4,605,653, 4,652,458, and 4,375,483, all of which are incorporated herein by reference.

Unsaturated fatty acids present in natural vegetable oils which make up triacylglycerols are of a cis-fatty acid configuration. Due to the non-linearity of the cis-fatty oil compounds, vegetable oils are in liquid form. By means of the hydrogenation process, hydrogen atoms are added to the cis-double bond to produce straight-chain saturated fatty acids. This process, if carried out selectively, can also be used to transform the cis-configuration of the fatty acid to its trans-isomer, which in turn increases the linearity of the fatty acid chains and thus their melting points without altering the degree of saturation or fully saturating the hydrocarbon chain. Through the process of selectivity, hydrogenation can be controlled to minimize saturation and maximize the production of the transconfigurations of fatty acids (partial hydrogenation). High melting fats, those which are saturated or have been partially hydrogenated, have important functions in a vast majority of food products. These fat crystals are added to liquid oils to impart structure/texture and plasticity by the interaction of many small fat crystals which restrict the flow of oil until some form of stress is applied. At rest the rheological properties of the fat are altered to produce conventional body and consistency found to be characteristic of shortening, margarine, etc. Another benefit of adding solid fats to liquid oils is that it increases the oxidative stability of liquid oil. Plastic fats are also useful in bakery applications to impart flakiness, body, and volume and to give aeration properties. Studies have shown that both fat types, saturated fats as well as those comprised of trans-fatty acids, raise the low density lipoprotein (LDL) cholesterol levels and lower high density lipoprotein (HDL) cholesterol, the "good cholesterol," which in turn increases the risk of coronary heart disease. Therefore, the need arises for alternate ingredients to texturize liquid fats which would have the same consistency and functionality as highly saturated fats or partially hydrogenated oils but which would be more healthful.

Further, U.S. Pat. No. 3,539,365, incorporated herein by reference, discloses the use of conventional sodium carboxymethyl cellulose (CMC)-containing finely divided cellulose as a thickener/gelling agent, where water is required to activate the resulting composition. The CMC acts as a barrier dispersant, i.e., it functions as a barrier to prevent bonding of the colloidal cellulose particles during drying and acts to disperse the compacted cellulose particles during reconstitution, in aqueous systems. Whereas the compositions disclosed in the '365 patent are widely used in water-based food systems, they do not function well in non-aqueous systems since they require water to activate the soluble CMC portion.

The invention presented herein advantageously provides a new thickener/stabilizer/gelling agent for use in lipid systems, particularly in edible lipid systems.

SUMMARY OF THE INVENTION

This invention affords a composition, which can be used to structure a liquid, particularly a lipid. Embodiments, also include a method of making that composition, and the use of that composition in lipids. The composition is an aggregate: a finely divided cellulose admixed with a surfactant. The aggregate is prepared by placing finely divided cellulose particles and a surfactant, into the same vessel; admixing the cellulose and the surfactant with sufficient shear to obtain a uniform mixture of cellulose and surfactant; and drying the mixture. A lipid is contemplated in which the composition is incorporated. The composition may be incorporated into the lipid by mixing the composition with the lipid, and shearing the aggregate to disperse it therein.

DETAILED DESCRIPTION OF THE INVENTION

Figure 1:
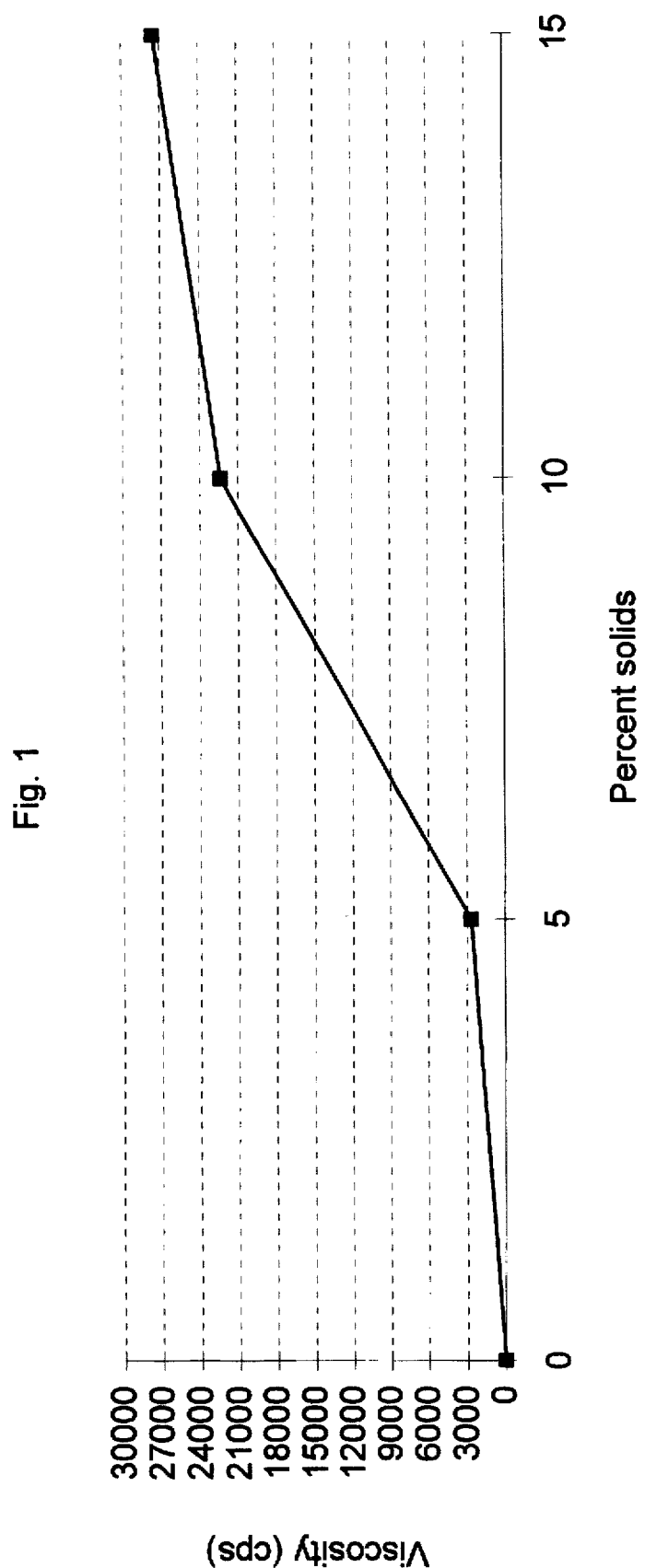
FIG. 1 is a graphic representation of the relationship of the viscosity of co-processed finely divided microcrystalline cellulose (MCC) and sorbitan monostearate (SMS), in an 85:15 ratio, in liquid oil as a function of solids content.

According to the invention a composition comprising a dry form thickener/stabilizer/gelling agent is useful in lipid systems. More specifically, the composition is a co-dried, preferably oleaginous, powder composition which is an aggregate of finely divided, substantially colloidal, cellulose, preferably microcrystalline cellulose, and one or more surfactants, wherein the aggregate, when mixed with an oil, disaggregates, upon the application of shear, to form a dispersion of surfactant and substantially colloidal cellulose; preferably the substantially colloidal cellulose is coated with the surfactant. This dispersion of the coated, substantially colloidal cellulose particles thickens, gels and imparts other useful rheological properties to that oil. Lipids structured with the cellulosic/surfactant composition of the invention have the consistency and functionality of some highly saturated fats or hydrogenated oils, making them useful in the formulation of "healthy" foods by providing some of the functionality of highly saturated fats or partially hydrogenated oils. The resulting colloidal network imparts heat stable form retention at high temperatures and functions to maintain particles such as salt, flavor, or color in suspension in the lipid.

The stabilizing/gelling compositions of the invention comprise a powder comprising from about 90 to 50% by weight, preferably from about 85 to 60% by weight, of finely divided substantially colloidal, cellulose particles having a mean particle size substantially in the range of from about 0.1 to 8.0μ, preferably from 0.1 to <1.0 micron, more preferably from 0.1 to 0.9 micron, and most preferably from 0.1 to 0.6 micron as determined by the Horiba Cappa 700 particle size analyzer; and from about 10 to 50% by weight, preferably from about 15 to 40% by weight, most preferably from 10 to 30% by weight of one or more surfactants, based upon the total weight of the powder. Generally, any particle size distribution is acceptable, as long as the mean particle size is within the desired range; however, preferably, 35 to 80 weight percent of the particles have a particle size less than 0.2 microns, and more preferably from 60 to 80 weight percent of the particles have a particle size less than 0.2 microns.

The surfactant component is adsorbed onto the surfaces of the substantially colloidal, cellulose particles to function as a barrier to prevent formation of cellulosic bond between the finely divided cellulose particles during the drying step. Also, when the powder aggregate is dispersed in a liquid oil, the surfactant acts as a dispersant to reconstitute and homogeneously disperse the finely divided cellulose and to aid in forming a three-dimensional network of finely divided, substantially colloidal, cellulose particles in the liquid oil. At certain concentrations of the finely divided cellulose/surfactant particles in the liquid oil, a stable gel will form; the gel formation is driven by the cellulose surfactant combination, and is independent of the actual chemicals used in the oil. This invention also concerns the preparation of the stabilizer/gelling composition which contains finely divided cellulose co-processed with specific surfactants to physically modify the surface characteristics of the cellulose. Altering the surface characteristics of the finely divided cellulose from hydrophilic to more lipophilic in nature by adsorption of surfactants on the surface of the cellulose, facilitates the preparation of dry, reconstitutible powder aggregate which readily disperses in a lipid environment to nearly original finely divided size and at sufficient concentrations form three-dimensional networks which structure liquid oils.

The term "cellulose" as used herein includes finely divided cellulose such as microcrystalline cellulose ("MCC"), prepared according to the hydrolysis preparation procedure described in Durand et al., U.S. Pat. No. 3,539,365 and Battista, U.S. Pat. No. 2,978,446. The effective functionality of the cellulose will depend on the surface area of the dispersed colloidal material, i.e., the greater the surface area the more effective is the material in dispersion.

Other useful cellulosic materials include powdered cellulose or cellulose obtained from non-woody plant sources such as wheat shafts, oat hulls, corn stalks and the like. These are potential sources of finely divided cellulose provided the size of the cellulose particles is appropriately reduced in size. This can be accomplished effectively by the use of wet or dry mechanical shear, chemical degradation treatment, or a combination thereof. The particle shape may be rod-shaped, round, spherical, platelet or irregular, dependent upon the processing methods or cellulose material, but is preferably rod-shaped to facilitate formation of the three-dimensional network once fully dispersed at sufficient concentrations to obtain a stable network.

The term "surfactant" denotes a chemical moiety with a measurable HLB (hydrophilic/lipophilic balance) within the range of from 1 to about 40. A surfactant has at least two types of moieties, a hydrophilic moiety and a hydrophobic moiety. Although HLB was developed as a means for categorizing emulsifiers according to their tendency to form emulsions containing oil and water, the HLB system has been and here is applied to surfactants including surface active agents, emulsifiers, wetting agents, and dispersants. Generally, the lower the HLB is, the greater is the tendency for the surfactant to dissolve in oil, and the higher the HLB is, the greater is the tendency for the surfactant to dissolve in water. A low HLB surfactant, about 2 to 8, is usually oil soluble; a high HLB surfactant of about 13 and greater is usually water-soluble; while an intermediate HLB surfactant has intermediate tendencies. This system which was developed by Griffin at ICI America is now a widely accepted empirically derived standard; it is used to help select an alternative surfactant based on the HLB of the surfactant being used. It is also used to select a group of surfactants, which has a net HLB within the needed range, even though the members of group individually may not have the needed HLB.

The term "surfactant" is meant to include food-grade emulsifiers of HLB range 1 to 40 and blends or mixtures of two or more of the foregoing, useful in structuring lipid systems. The surfactants are characterized in that the resultant structural lipid systems have a viscosity of at least about 10,000 cps, preferably at least about 15,000 cps, and most preferably at least about 18,000 cps, at a minimum solids content. Useful emulsifiers according to the invention include food-grade lecithin, monoglycerides, acetylated monoglycerides, ethoxylated monoglycerides, sorbitan esters, monostearates, diacetyl tartaric acid esters of mono- or diglycerides, polysorbates, and sodium stearoyl lactylate. Mixtures or blends of two or more of any of the foregoing may be useful according to the invention.

The term "surfactant" as used herein does not include any hydrocolloid. Hydrocolloids are naturally occurring colloidal products, typically gums such as sodium carboxymethyl cellulose (CMC), carrageenan, pectin, agar, guar, and locust bean gum, which have hydrophilic moieties, but not hydrophobic moieties. Hydrocolloids can disperse in water to produce a colloidal system. They are sometimes used as protective colloids or as stabilizers for emulsions and suspensions. Some have also been processed with cellulose.

The surfactants of this invention have an HLB within the range of from 1 to 40; preferably within the range of from 1 to 25; more preferably within the range of 2 to 13; and most preferably within the range of from 5 to 9.

Co-processing is accomplished by any of several physical processes. These include co-processing cellulose with an emulsion, a suspension, or a solution of surfactant. Suitable processes, alone or in combination, include intensive wet co-milling of cellulose and surfactant, high intensity mixing using a Henschel, Littleford-Day or other suitable mixer, co-extrusion of the cellulose and the surfactant, using any one of a number of commercially available extruders, and subsequent drying in a spray dryer, bulk co-drying using a fluid bed dryer or some other suitable dryer, air drying, freeze drying, or spray chilling of co-emulsified or co-suspended cellulose and surfactant using a suitable spray chiller. When wet-processed, the liquid may be water, a non-aqueous solvent such as alcohol, or a mixture thereof. Agents that improve the compatibility of the components may also be used in any of the above processes. A preferred process includes high-intensity mixing in an aqueous solution followed by co-drying.

The co-processed product is an aggregate of substantially colloidal cellulose, preferably a microcrystalline cellulose, and a surfactant. The size of the aggregate is dependent upon the method of manufacture, however, generally the size will range from 5 to 100 microns. Preferably, the aggregate will have a mean size of from 10 to 60 microns; more preferably, the aggregate will have a mean size of from 20 to 50 microns; and most preferably, the aggregate will have a mean size of from 20 to 40 microns.

A processing method by which the hydrophilic surface of the finely divided cellulose is converted from hydrophilic in nature to one with more lipophilic characteristics, involves (1) preparation of intimate colloidal mixture of highly dispersed finely divided cellulose in water, (2) the high shear emulsification of the surfactant in that same aqueous mixture, and (3) sufficient shear and/or mixing to obtain an intimate, homogenous mixture of the finely divided cellulose particles and the micro, fine surfactant droplets. Then, evaporation, preferably instantaneous, of the water or any other solvent present causes the surfactant to adhere to the surface of the cellulose particles. To obtain good coverage of the cellulose and to obtain most of the original particle surface area after reconstitution, micro-mixture of the components is essential.

Powdered samples of co-processed finely divided cellulose aggregate with a surfactant or surfactants, e.g., sorbitan monostearate, easily reconstitute (redisperse) to near original particle size when sheared in a liquid such as liquid vegetable oil, indicating nearly complete coverage of the available cellulose surface. In a preferred method a beadmill is used, the horizontal beadmill providing the most effective shearing. Processing of MCC/surfactant powder in liquid vegetable oil with a horizontal beadmill produces the most effective dispersion of spray dried aggregates. Preferably the powdered aggregate/lipid mixture is mixed in a commercial blender to provide a homogeneous dispersion of the powdered aggregate, which in turn results in more effective use of the dispersing equipment, such as a beadmill.

Another aspect of the invention concerns both the amount of shearing the gelling agent/lipid undergoes and the solids content of the gelling agent/lipid. Co-processing, such as spray drying, can produce aggregates, which must be subjected to mechanical shearing by a beadmill or similar mechanical device to disaggregate particles. The number of passes through a shearing device such as a beadmill is important with regard to effecting dispersion of the powder aggregate within the lipid to impart desired structure, as is reflected by an increase in viscosity. It has been found that one or more passes, preferably from one to five passes, of the gelling agent/lipid through a shearing device such as a beadmill, are required to achieve a viscosity that reflects structure development in the oil, e.g., at least about 10,000 cps. Testing has shown a solids content of at least 10% of the gelling agent, based upon the total weight of the gelling agent/lipid component, to be effective to achieve the desired viscosity and consistency values. However, Applicants expect that certain gelling agents according to the invention can or will be effective at solids contents less than 10%.

Maintaining the original particle size (distribution and surface area) of finely divided cellulose dispersed into liquid oil produces gelled forms of the liquid oils. The gels are stable and do not exhibit oil separation from the gel matrix. Soft, deformable gels have a plastic consistency readily spreadable and tend to resemble lard or vegetable shortening. In addition, a colloidal network in oil functions to maintain certain particles, e.g., salt, flavor, colors, suspended in the liquid oil. The finely divided cellulose structure also imparts heat stable form retention at high temperatures, a property that could be very useful in food products. The three-dimensional cellulose network immobilizes the oil and controls the rheology and flow properties of the oil.

The invention can be appreciated from the following examples, which are intended as a further illustration of the invention, but not as a limitation on the scope of the invention. All parts and percentages in the examples, and throughout the specification and claims, are by weight, and all temperatures are in degrees centigrade, unless otherwise indicated.

EXAMPLES

Example 1 a. Preparation of Finely Divided Microcrystalline Cellulose 1534 g of microcrystalline cellulose (FD-100, available from FMC Corporation, Philadelphia, Pa.) with a moisture content of 2–3% was dispersed in $1210^3$ g of distilled water with a Dispersator Mixer (propeller Mixer available from Premier Mill Corp., Temple, Pa.) fixed with a rheostat operating at ~50 V output to make an 11% solids slurry. The dispersion was pumped with a pulsating air pump set at 1.5 cc/stroke (1.7 gal/hr) into a 1.4 liter lab scale beadmill (Dyno-Mill; Type KDL Pilot, manufactured by Willy A. Bachofen), loaded to 90% volume with Zirconia grinding media (0.6–0.9 mm in diameter), which during processing was set into motion with an agitator shaft revolving at 10 meter/second. The resulting product was a viscous gel containing finely divided cellulose with a narrow particle size distribution. Particle size analysis, measured on a Horiba Cappa 700 Particle Size Analyzer, revealed that a single pass through the mill reduced the particle size of the cellulose from an initial mean of 20 μm to 0.7 μm, where 20% of the particles had a particle size below 0.25 μm.

As an alternative to preparing finely divided MCC with beadmill attrition, such finely divided cellulose microcrystals could also be obtained by chemical/mechanical treatment such as high solids attrition of hydrolyzed cellulose as described in Durand et al., U.S. Pat. No. 3,539,365.

b. Preparation of Powder 6193.1 g of finely divided MCC gel consisting of 11.2% solids, prepared with beadmill attrition, was diluted to 4.28% solids with 10004.5 g of distilled water using a LIGHTNIN® mixer and heated in a steam kettle to 93.3° C. (200° F.). 122.4 g of sorbitan monostearate (Polycon S60K, available from Witco Corporation, Memphis, Tenn.) incorporated as a barrier dispersant to finely divided MCC during the spray drying process, was melted (53° C.) in a stainless steel beaker on a Corning PC-100 hot plate. The total amount of cellulose slurry was added to a colloid mill (W 250 V-B Mill from Greerco Corporation), operating at 100 volts output (frequency of 62.5 Hz) and set with the gap clearance at 10 mil. A LIGHTNIN mixer attachment was fixed on the colloid mill holding tank to eliminate dead areas of mixing. Sorbitan monostearate was slowly added to the cellulose slurry, and the mixture was milled for ten minutes. The final composition, with a batch size of 16320 g, was 5% solids comprised of an 85/15 ratio of finely divided MCC/sorbitan monostearate. The resulting slurry was homogenized one pass at 3000 psi (2500 psi 1st stage, 500 psi 2nd stage) with a two stage homogenizer (APV Gaulin Inc.) and spray dried at inlet and outlet temperatures of 185° C. and 105° C., respectively, with a 3' Stork-Bowen spray dryer fixed with a spray nozzle atomizer (air pressure 90 psi) to yield 357 g of a fine free flowing powder with a moisture content of 3.3%.

c. Reconstitution of Powder into Liquid Oil

Wetting cellulose aggregates in liquid soybean oil was the first step directed toward reconstitution. 300 g of powder prepared in Example 1b was dispersed in 1700 g of pure soybean oil (A&P brand) with a five liter Commercial Heavy Duty WARING® Blendor set to the medium speed setting and fixed with a rheostat operating at 50 volts output for ten minutes, and the resulting mixture of 15% solids content was subsequently subjected to the beadmill loaded with the same type/amounts of milling media and processing conditions described in Example 1a. After a single pass, the viscosity of the oil system increased from an initial 210 cps (thin fluid), where powder was merely dispersed in oil with a WARING Blendor, to $8.25 \times 10^3$ cps (thick and slightly gelled). Maximum viscosity build-up ($27.5 \times 10^3$ cps) was obtained after two passes as measured by Brookfield Viscometer (spindle if #6; 20 rpm; one minute; 25° C.). Samples diluted to 10% solids content and passed through the beadmill for a third pass were reduced with respect to viscosity to $17.4 \times 10^3$ cps whereas an additional fourth pass at 10% solids content resulted in an increase in viscosity to $22.4 \times 10^3$ cps. Additional dilutions, down to 5% solids content, and processing through a fifth pass, resulted in a drastic decrease in viscosity ($2.7 \times 10^3$ cps). Multiple passes at this solids level did not change the viscosity of the system.

A graphic depiction of the maximum viscosities reached at 5%, 10%, and 15% solids content, respectively, is set forth in FIG. 1.

Example 2 a. Surfactant Types

Example 1c describes the liquid oil texturizing capabilities of product comprised of finely divided MCC and sorbitan monostearate. Alternate surfactants with various chemical structures and HLB values were screened in the same manner as was sorbitan monostearate regarding their ability to structure liquid oils. The following describes the co-processing of Panodan 150 (blend of diacetyl tartaric acid ester of monodiglyceride and other mono- and diglycerides, available from Grinstead Brabrand, Denmark) with finely divided MCC and the characterization of the inherent oil structuring properties.

b. Powder Preparation 6193.1 g of finely divided MCC gel consisting of 11.2% solids, was diluted to 4.28% solids with 10,004.5 g of distilled water using a LIGHTNIN mixer, and the resulting slurry was heated in a steam kettle to 93.3° C. (200° F.). 122.4 g of Panodan 150 were melted (56° C.) in a stainless steel beaker on a Corning PC-100 hot plate. The total amount of the cellulose slurry was added to a colloid mill (W 250 V-B Mill), operating at 100 volts output (frequency of 62.5 HZ) and set with the gap clearance at 10 mil. A LIGHTNIN mixer attachment was fixed on the colloid mill holding tank to eliminate dead areas of mixing. Panodan 150 was slowly added to the cellulose slurry, and the mixture was milled for 10 minutes. The final composition, with a batch size of 16320 g, was 5% solids content comprised of an 85/15 ratio of finely divided MCC/Panodan 150. The resulting slurry was homogenized one pass at 3000 psi (2500 psi 1st stage, 500 psi 2nd stage) with a two-stage homogenizer (APV Gaulin Inc.) and spray dried at inlet and outlet temperatures of 185° C. and 105° C., respectively, with a 3' Stork-Bowen Spray dryer fixed with a spray nozzle atomizer (air pressure 90 psi) to yield 441 g of fine free flowing powder with a moisture content of 3.3%.

c. Reconstitution of Powder into Liquid Oil 300 g of finely divided MCC/Panodan 150 powder from Example 2b was dispersed in 1700 g of pure soybean oil (A&P brand) with a five liter Commercial Heavy Duty WARING Blendor set to the medium speed setting and fixed with a rheostat operating at 50 volts output for 10 minutes, and the slurry produced was subsequently subjected to the beadmill charged with 90% Zirconia media. The oil slurry was pumped through the mill at a feed rate of 1.7 gallons/hour. After a single pass, the viscosity of the oil system increased from an initial 210 cps (thin fluid) to $6.55 \times 10^3$ cps (thick and slightly gelled). Maximum viscosity build-up ($22.2 \times 10^3$ cps) was obtained after two passes as measured by Brookfield Viscometer (spindle #6; 20 rpms; one minute; 25° C.). Samples diluted to 10% solids content and passed through for a third pass were reduced in terms of viscosity to $12.6 \times 10^3$ cps, whereas an additional fourth pass at 10% solids resulted in an increase to $14.8 \times 10^3$ cps. Additional dilutions, down to 5% solids content, and processed through a fifth pass, resulted in drastic decreases in viscosity ($2.2 \times 10^3$ cps). Multiple passes at this solids level did not change viscosity of the system.

Example 3

Surfactant Blends a. Powder Preparation 6193.1 grams of colloidal MCC gel consisting of 11.2% solids prepared using the same method as described in Example 1a, was diluted to 4.28% solids with 10,004.5 g of distilled water using a LIGHTNIN mixer and heated in a steam kettle to 93.3° C. (200° F.). 24.5 g of DURFAX 60 (polysorbate 60, available from Van den Berg Foods Company, Lisle, Ill.) was added to 97.9 g of sorbitan monostearate in a stainless steel beaker. The surfactant blend was melted (53° C.) on a Corning PC-100 hot plate and hand stirred to obtain a homogenous mixture. The whole amount of cellulose slurry was added to a colloid mill (W 250 V-B Mill from Greerco Corporation), operating at 100 volts output (frequency of 62.5 HZ) and set with the gap clearance at 10 mils. A LIGHTNIN mixer attachment was fixed on the colloid mil holding tank to eliminate dead areas of mixing. The surfactant blend was slowly added to the cellulose slurry and milled for 10 minutes, where the final composition, with a batch size of 16320 g, was 5% solids comprised of an 85/12/3 ratio of colloidal MCC/sorbitan monostearate/polysorbate 60. The resulting slurry was homogenized one pass at 3000 psi (2500 psi 1st stage, 500 psi 2nd stage) with a two stage homogenizer (APV Gaulin Inc.) and spray dried at inlet and outlet temperatures of 185° C. and 105° C., respectively, with a 3' Stork-Bowen spray dryer fixed with a spray nozzle atomizer (air pressure 90 psi) to yield 355 g of fine free flowing powder with a moisture content of 3.3%.

b. Reconstitution of Powder into Liquid Oil 300 g of colloidal MCC/sorbitan monostearate/polysorbate 60 powder (85/12/3) was dispersed in 1700 g of pure soybean oil (A&P brand) with a 5 liter Commercial Heavy Duty WARING Blendor set to the medium speed setting and fixed with a rheostat operating at 50 volts output for 10 minutes and was subsequently subjected to the beadmill charged with 90% Zirconia media. The oil slurry was pumped through the mill at a feed rate of 1.7 gallons/hour. After a single pass, the viscosity of the oil system increased from an initial 230 cps (thin fluid) to $24.0 \times 10^3$ cps (thick and gelled). Maximum viscosity build-up ($36.5 \times 10^3$ cps) was obtained after two passes as measured by Brookfield Viscometer (spindle #6; 20 rpms; one minute; 25° C.). Samples diluted to 10% solids content and passed through for a third pass were reduced in terms of viscosity to $11.4 \times 10^3$ cps, whereas an additional, fourth pass at 10% solids content resulted in an increase to 16.8×10³ cps. Additional dilution, down to 5% solids content, and processed through a fifth pass, resulted in a drastic decrease in viscosity (3.6×10³ cps). Multiple passes at this solids level did not change viscosity of the system.

Other surfactants were co-processed with finely divided MCC and reconstituted in oil using the same procedures described with respect to Polycon S60K and Panodan 150. The results are set forth in the table below, where "MP" represents the melting point of the surfactant and "Shear" represents the number of passes through a beadmill required to achieve full dispersion of powder aggregate in oil, as determined by optimum viscosity:

TABLE

Characteristics of Certain Surfactants and Their Functionality in Lipid Systems

| Chemical Type | HLB | MP (°C.) | Highest viscosity reached in Oil (15%) | Shear |
|---|---|---|---|---|
| Sorbitan Monostearate/ polysorbate 60 (80:20) (Polycon S60K/Durfax 60) | 6.7 | 53 | 36,500 cps | 2 passes |
| Sorbitan Monostearate (Polycon S60K) | 4.7 | 53 | 27,500 cps | 2 passes |
| Diacetyl Tartaric Acid Ester of Monodiglycerides (Panodan 150) | 7–8 | 56 | 22,250 cps | 2 passes |
| Polyglycerol Ester (Santone 3-1-SXTR) | 7.2 | 52–57 | 22,250 cps | 3 passes |
| Ethoxylated Monodiglycerides (Tally 100) | 7.7 | 54–58 | 20,000 cps | 3 passes |
| Acetylated Monodiglycerides (Myvacet 9-45) | 4.5 | liquid at room temp. | 10,600 cps | 6 passes |
| Polysorbate 60 (Durfax 60) | 14.9 | liquid at room temp. | 16,700 cps | 5 passes |
| Sodium Stearoyl Lactylate (Emulsilack SK) | 21 | 49 | 26,750 cps | 3 passes |
| Distilled Monoglycerides (Dimodan OK) | 4.3 | 60 | 19,500 cps | 2 passes |
| Lecithin (Emulpur N-P1 (deoiled soybean lecithin) 33% PC) | 4–5 | 60–65 | 13,500 cps | 3 passes |
| Lecithin (MC-Thin AF-1/DB (natural soybean lecithin) 10% PC) | 4–5 | liquid at room temp. | 21,000 cps | 3 passes |
| Partially Hydrogenated Fat* (Kaomel) | — | 36 | 5,300 cps | 5 passes |
| Propylene Glycol Monostearate (Myverol P-06K) | 4.5 | 45 | 8,250 cps | 5 passes |
| Sucrose Polyester (Ryoto ER-190) | 1 | liquid at room temp. | 1,020 cps | 4 passes |
| Polyglycerol Esters of Ricinoleic Acid (Triodan R-90) | Unkw | liquid at. room temp. | 1,580 cps | 4 passes |

*Control

Example 4

Cellulose Types

Alternate grades/types of cellulosic material were investigated as to their ability to function with surfactants and to gel liquid oil. 1,002.7 g of an experimental hydrolyzed cellulose prepared from paper-grade wood pulp, with a moisture content of 4.8% was dispersed in 12634.3 g of distilled water with a Dispersator Mixer (propeller mixer from Premier Mill Corp. Temple, Pa.) fixed with a rheostat operating at ~50 V output to make a 7% solids slurry. The dispersion was pumped with a pulsating air pump set at 1.5 cc/stroke (1.7 gal/hr) into a 1.4 liter lab scale beadmill (Dyno-Mill; Type KDL Pilot), loaded to 90% volume with Zirconia grinding media (0.6–0.9 mm in diameter), which during processing was set into motion with an agitator shaft revolving at 10 meter/second. The resulting product was a thick gel comprised of finely divided cellulose particles. By use of the same procedure, Solka-floc 200FCC, an unhydrolyzed grade of cellulose available from Fiber Sales & Development Corporation, Urbana, Ohio, was attrited in the beadmill at 5% solids concentration.

Both cellulose materials were separately co-processed with sorbitan monostearate to obtain a reconstitutable powder using the procedure below, which is specific for the experimental hydrolyzed cellulose. 10,000.0 g of finely divided MCC gel obtained by beadmill attrition of experimental hydrolyzed cellulose consisting of 6.8% solids, was diluted to 4.28% solids with 5880 g of distilled water using a LIGHTNIN mixer and heated in a steam kettle to 93.3° C. (200° F.), 120.0 g of sorbitan monostearate (Polycon S60K) was melted (53° C.) in a stainless steel beaker on a Corning PC-100 hot plate. Cellulose slurry was added to a colloid mill (W 250 V-B Mill), operating at 100 volts output (frequency of 62.5 HZ) and set with the gap clearance at 10 mil. A LIGHTNIN mixer attachment was fixed on the colloid mill holding tank to eliminate dead areas of mixing. Sorbitan monostearate was added slowly to the cellulose slurry, and the resulting mixture was milled for ten minutes. The final composition, with a batch size of 16,000 g, was 5% solids comprised of an 85/15 ratio of experimental finely divided MCC/sorbitan monostearate. The resulting slurry was homogenized one pass at 3000 psi (2500 psi 1st stage, 500 psi 2nd stage) with a two-stage homogenizer (APV Gaul in Inc.) and spray dried at inlet and outlet temperatures of 185° C. and 105° C., respectively, with a 3' Stork-Bowen spray dryer fixed with a spray nozzle atomizer (air pressure 90 psi) to yield a fine free flowing powder with a moisture content of 3.0%. With the exception of spray drying at a total solids concentration of 3%, the sample containing Solka-floc was processed in the exact same manner.

After reconstitution of samples in liquid oil via beadmill, both grades of cellulose functioned equally well with sorbitan monostearate (SMS) to gel the lipid system. 300 g of each powder was separately dispersed in 1700 g of pure soybean oil (A&P brand) with a five liter Commercial Heavy Duty WARING Blendor fixed with a rheostat operating at 50 volts output for ten minutes, and the resulting mixture was subsequently subjected to the beadmill. The dispersion was pumped with a pulsating air pump set at 1.5 cc/stroke (1.7 gal./hr) into a 1.4 liter lab scale beadmill (Dyno-Mill; Type KDL Pilot), loaded to 90% volume with Zirconia grinding media (0.6–0.9 mm in diameter), which during processing was set into motion with an agitator shaft revolving at 10 meter/second. Milling Solka-floc/SMS in oil a total of four passes viscified soybean oil from an initial 230 cps to 21.2×10³ cps as measured by a Brookfield viscometer (spindle #6; 20 rpms; one minute; 25° C.). The powder consisting of experimental hydrolyzed cellulose/SMS exhibited the same properties as Solka-floc/SMS. The latter experiment indicates that alternate grades of cellulose can provide comparable results as FD-100 cellulose to function as a component to thicken/gel liquid oils.

Example 5

Texturizing Capabilities in Other Fat Types

Figure 2:
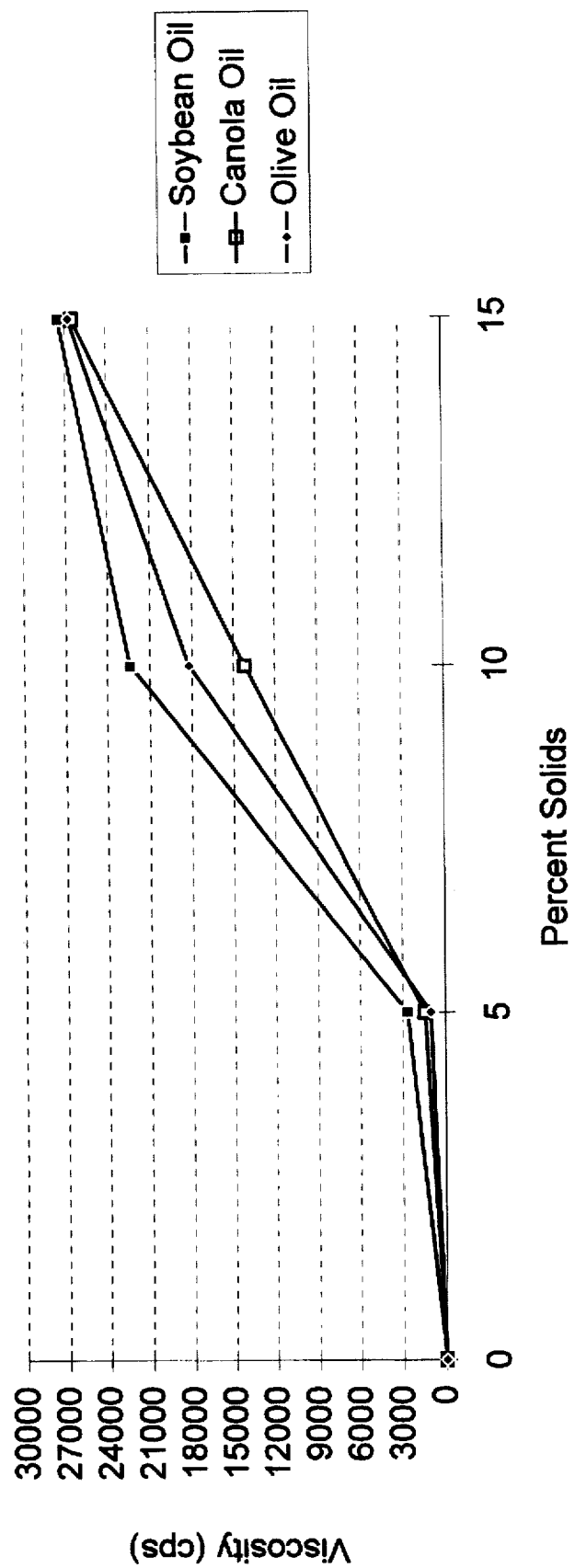
FIG. 2 is a graphic representation of the viscosity of co-processed MCC/SMS in an 85:15 ratio dispersed in various vegetable oils as a function of solids content.

Previous examples of reconstituting finely divided MCC/surfactant powders in oils have all focused on one type of oil, namely, 100% soybean oil. Three additional fats, canola oil (Hollywood brand), which has a lower degree of saturated fat than soybean oil, olive oil (Cento brand), approximately the same degree of saturation as soybean oil, and Kaomel, a partially-hydrogenated vegetable oil (cottonseed and soybean oil, available from Van den Berg Foods Co., Lisle, Ill.), were also tested for their ability to be texturized by reconstituting finely divided MCC/SMS powder following the same techniques as in Example 1c. A graphic representation of the results obtained with regard to soybean oil, canola oil, and olive oil, is set forth in FIG. 2.

In the sample containing canola oil and 15% finely divided MCC/SMS powder, the viscosity, in a total of two passes, increased from 250 cps to $26.5 \times 10^3$ cps. At 15% solids concentration, olive oil was structured to the same extent. In a total of two passes, the viscosity increased from 270 cps to $27.2 \times 10^3$ cps. As found in Example 1 c, the viscosity of soybean oil was as high as $27.5 \times 10^3$ cps. Results indicate that regardless of liquid oil type, finely divided MCC/SMS powder functions equally well to structure these oil systems.

Slight procedural modification was required to reconstitute the powder aggregate in a high melting fat such as Kaomel. The following is the procedure used to reconstitute 15% colloidal MCC/SMS powder aggregate into Kaomel: 1700 g of Kaomel was melted on a Corning PC-100 hot plate (70° C.) in a 4000 ml stainless steel container. 300 g of colloidal MCC/SMS (85/15) powder aggregate was dispersed in the molten fat phase with a LIGHTNIN mixer operating at 1300 rpm for ten minutes. To maintain heat to the slurry, the feed tank to the beadmill was heated with electrothermal tape. The dispersion was pumped with a pulsating air pump set at 1.5 cc/stroke (1.7 gal/hr) into a 1.4 liter lab scale beadmill (Dyno-Mill; Type DKL Pilot manufactured by Willy A. Bachofen), loaded to 90% volume with Zirconia grinding media (0.6 to 0.9 mm in diameter), which during processing was set into motion with an agitator shaft revolving at 10 meter/second. Two consecutive passes were achieved before the fat phase began to solidify, thus hampering further passes. It was essential that the slurry temperature remained higher than the melting point of Kaomel to insure proper milling operations.

Kaomel, in the melted form, was structured/gelled by reconstituting finely divided MCC/SMS powder aggregate in the beadmill. This material, when cooled, has the appearance of pure Kaomel. However, upon melting the appearance of this fat system was noticeably different. Whereas pure Kaomel melts to a clear liquid, the sample containing finely divided MCC/SMS melted to form a gel. At temperatures substantially higher than the melting point of Kaomel, the gel structure remains stable.

Example 6

Surfactant Levels

The ratio of surfactant to MCC was examined in order to determine the minimum amount of surfactant required to effectively function as a barrier dispersant for finely divided cellulose. Three ratios of colloidal MCC and sorbitan monostearate were studied: 85/15, 90/10, 95/5. Other than altering surfactant levels in the samples, powder preparation and reconstitution in liquid oil was accomplished in the same manner as Example 1. Viscometric profiles of each sample are depicted in the graph of viscosity vs. applied shear (number of passes) set forth in FIG. 3.

Figure 3:
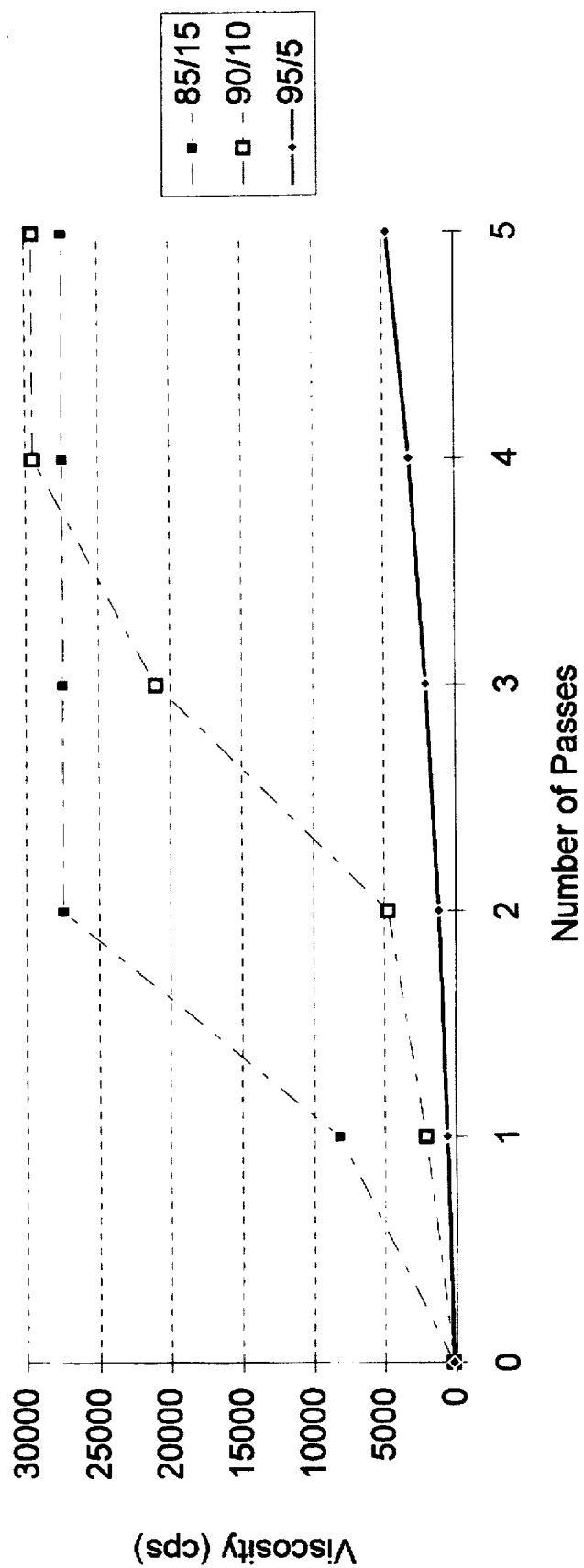
FIG. 3 is a graphic representation of the viscosities of MCC/SMS compositions at varying ratios according to the invention versus applied shear.

It is evident from the profiles plotted on the graph of FIG. 3 that finely divided cellulose requires between 10% and 5% surfactant, based upon the weight of cellulose, to function as a barrier and to prevent individual cellulose crystals from bonding. 5% surfactant, clearly observed in the graph of FIG. 3 indicates that aggregated cellulose particles could not be dispersed after six consecutive passes through the beadmill whereas 10% surfactant begins to disperse between 2 and 3 passes, indicating barrier dispersant characteristics. An even more effective barrier is portrayed with 15% surfactant dispersing between 1 and 2 passes. It should be noted, for FIG. 3 that the last viscosity points for the 85/15 and 90/10 samples are shown to level off between 25000 cps and 30000 cps. These last viscosity points are estimates represented by dotted lines because the samples thickened to the point where pumping became difficult, thus impeding further passes. In actuality, viscosities may be higher with additional passes rather than level off as depicted on the graph in FIG. 3.

Example 7

Other than solely behaving as a barrier dispersant to finely divided MCC particulates during the drying process as described in Example 2, the surfactant also functions as a synergistic ingredient with cellulose to structure liquid oil. This property was demonstrated by experimentation conducted with larger sized MCC particles (6μ) co-processed with sorbitan monostearate at a 90/10 ratio and reconstituted in liquid oil. The reason that the larger sized MCC particles were used rather than the finely divided cellulose is that the 6 μ particle size powder cellulose used was the smallest particle size dry cellulose powder available for this test.

a. Powder Preparation 1846.2 g of FD-006 microcrystalline cellulose (6μ, available from FMC Corporation, Philadelphia, Pa.) with a moisture content of 2.5% was dispersed with a LIGHTNIN mixer in 11287.2 g of distilled water heated to 5 93.3° C. (200° F.) via steam kettle. 200 g of sorbitan monostearate was melted (53° C.) in a stainless steel beaker on a Corning PC-100 hot plate. The total amount of cellulose slurry was added to a colloid mill operating at 100 volts output (frequency of 62.5 HZ) and set with the gap clearance at 10 mil. A LIGHTNIN mixer attachment was fixed on the colloid mill holding tank to eliminate dead areas of mixing. Sorbitan monostearate was slowly added to the cellulose slurry, and the resulting mixture was milled for 10 minutes. The final composition, with a batch size of 13333.3 g, was 15% solids comprised of a 90/10 ratio of FD-006/sorbitan monostearate. The resulting slurry was homogenized one pass at 3000 psi (2500 psi 1st stage, 500 psi 2nd stage) with a two-stage homogenizer (APV Gaulin Inc.) and spray dried at inlet and outlet temperatures of 160° C. and 85° C., respectively, nozzle atomizer (air pressure 90 psi) to yield 1160 g of free flowing powder with a moisture content of 4.5%.

b. Reconstitution in Liquid Oil 300 g of 85/15 FD-006/SM powder was dispersed in 1700 g of pure soybean oil (A&P brand) with a five liter Commercial Heavy Duty WARING Blendor set to the medium speed setting fixed with a rheostat operating at 50 volts output for 10 minutes, and the resulting mixture was subsequently subjected to the beadmill loaded with the same type/amounts of milling media and processing conditions described in Example 1a. After a single pass, the viscosity of the oil system increased from an initial 200 cps (thin fluid), to $1.79 \times 10^3$ cps. Maximum viscosity build-up ($13.0 \times 10^3$ cps) was obtained after seven passes as measured by Brookfield Viscometer (spindle #6; 20 rpms; one minute; 25° C.). Neither FD-006 nor surfactant, milled separately in soybean oil at same concentrations found in the co-processed powder, generated significant viscosity build-up in liquid oils. The recorded viscosity for the cellulose sample milled in the beadmill at 15% solids was 660 cps, and the viscosity of the surfactant milled at 1.5% solids was measured at 130 cps, evidence that MCC and sorbitan monostearate are synergistic with each other in structuring liquid oils.

Example 8

Suspension Properties of Oil Gels

Five 50 ml samples of soybean oil structured/gelled with colloidal MCC/sorbitan monostearate (85/15) powder using techniques described in Example 1c at various solids contents (15%, 10%, 5%, 3.5%, and 2.5%) were placed in 50 ml graduated cylinders. 1 g of food colored granulated sugar crystals were mixed into the oil systems by hand stirring and observed over a two week period at room temperature for indications of sugar particle sedimentation. At the end of two weeks, the lipid systems consisting of 15%, 10%, 5%, and 3.5% solids concentrations showed no signs of sugar crystal sedimentation. The sample comprised of 2.5% solids did not exhibit a gel matrix strong enough to maintain the suspension of sugar crystals. Within seconds after sugar crystals were mixed into this particular sample, the particles were observed falling out.

Example 9

Heat Stability 200 g of liquid soybean oil, structured/gelled with 15% colloidal MCC/sorbitan monostearate (85/15) powder prepared according to the techniques described in Example 1c was placed on a frying pan and slowly heated on a Corning PC-100 hot plate to determine the heat stability of the gel. The temperature was recorded with a Fluke 52 K/J thermometer, and the consistency of the gelled oil and changes were recorded at 10° F. intervals up to 250° F. For temperatures up to 160° F. the consistency of the texturized lipid system appeared unaltered from the original form. At 165° F. the gel system became noticeably more viscous, actually thickening with increasing temperatures, and remained at that consistency through the duration of the heating cycle (to 250° F.). The lipid system did not reveal any signs of instability or change in consistency at elevated temperature. Rheologically controlled liquid oils could be useful in toaster products, extruded snacks, and batter coatings.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A composition comprising a co-processed powered comprising aggregate (1) from about 90 to 50% by weight of a finely divided substantially colloidal cellulose component having a mean particle size of from about 0.1 to 1 micron and (2) from about 10 to 50% by weight of a surfactant component comprising one or more surfactants.

2. The composition of claim 1 which comprises from about 85 to 60% by weight of the finely divided cellulose component.

3. The composition of claim 1 wherein the cellulose component has a mean particle size of about 0.1 to 0.5 micron.

4. The composition of claim 1 wherein the surfactant component is adsorbed onto the surface of the finely divided cellulose component.

5. The composition of claim 4 wherein the surfactant component has a hydrophilic lipophilic balance within the range of about 5 to about 9.

6. The composition of claim 1 wherein the finely divided cellulose component comprises from 1 to 7% by weight of water, based upon the total weight of the cellulose product.

7. The composition of claim 1, wherein the surfactant component comprises one or more surfactants selected from the group consisting of lecithin monoglycerides, acetylated monoglycerides, ethoxylated monoglycerides, sorbitan esters, monostearates, diacetyl tartaric acid esters of mono- or diglycerides, polysorbates, and sodium stearoyl lactylate.

8. The composition of claim 7 wherein the surfactant component comprises sorbitan monostearate.

9. The composition of claim 7 wherein the surfactant is sodium stearyl lactolate.

10. The composition of claim 1 wherein the surfactant component has a hydrophilic lipophilic balance within the range of about 2 to about 13.

11. The composition of claim 1 wherein the surfactant component has a hydrophilic lipophilic balance within the range of about 1 to 25.

12. A method for modifying an edible lipid which comprises stabilizing, thickening or gelling the lipid by (a) admixing the lipid with from about 5 to 25% by weight of a composition comprising a powder aggregate having (1) a finely divided substantially colloidal cellulose component having a mean particle size of from about 0.1 to 8 microns and (2) a surfactant component comprising one or more surfactants based upon the total weight of the gelling agent and the lipid, to form an admixture, and (b) shearing the aggregate to disperse it therein.

13. The method of claim 12 wherein in step (a) from about 10 to 15% by weight of the composition is admixed.

14. The method of claim 13 wherein step (b) is repeated one to three times.

15. The method of claim 12 wherein step (b) is repeated one or more times.

16. A stabilized edible lipid composition prepared according to the method of claim 12.

17. A method of making a powdered aggregate having (1) from about 90 to 50% by weight of a finely divided substantially colloidal cellulose component having a mean particle size of from about 0.1 to 1 micron and (2) from about 10 to 50% by weight of a surfactant component comprising one or more surfactants comprising admixing said cellulose particles and said surfactant component; mixing until the admixture is uniform and drying the admixture.

* * * * *